United States Patent [19]

Zindler et al.

[11] Patent Number: 4,669,590
[45] Date of Patent: Jun. 2, 1987

[54] BRAKE RELEASED CLUTCH MECHANISM

[76] Inventors: Hugh A. Zindler, Rte. 3, Pleasant Valley La., Watertown, Wis. 53094; Sheldon D. Pollow, W201 N10360 Willo Creek Rd., Colgate, Wis. 53017

[21] Appl. No.: 654,214

[22] Filed: Feb. 2, 1976

[51] Int. Cl.$^4$ ............... A01D 69/00; A01D 69/08; F16D 67/02

[52] U.S. Cl. .................... 192/17 R; 56/11.3

[58] Field of Search ............ 192/36, 17 R, 26, 17 A, 192/102, 103 B, 16, 91 A, 89 A, 26

[56] References Cited

U.S. PATENT DOCUMENTS

| | | | |
|---|---|---|---|
| 1,106,156 | 8/1914 | Ogg | 192/104 B |
| 2,130,486 | 9/1938 | Florcyk | 192/26 |
| 2,136,381 | 11/1938 | Hile | 192/26 |
| 2,529,121 | 11/1950 | Weiland | 192/17 A |
| 2,675,103 | 4/1954 | Weber | 192/17 C |
| 2,689,634 | 9/1954 | Fawick | 192/91 A |
| 2,823,975 | 2/1958 | Kirby | 192/17 R |
| 2,969,861 | 1/1961 | Wright | 192/26 |
| 3,253,391 | 5/1966 | Meldahl | 192/17 R |
| 3,461,994 | 8/1969 | Dallman et al. | 192/17 R |

FOREIGN PATENT DOCUMENTS

| | | |
|---|---|---|
| 2158591 | 4/1973 | France . |
| 46-17855 | 6/1971 | Japan . |

*Primary Examiner*—Paul J. Hirsch
*Attorney, Agent, or Firm*—Andrus, Sceales, Starke & Sawall

[57] ABSTRACT

A clutch mechanism between rotating drive and driven members particularly for smaller horsepower applications. A drum is carried on the drive member. The driven member carries clutch shoes that are movable into and out of engagement with the drum. Springs are provided for effecting movement of the shoes into engagement with the drum to drivingly clutch the drive and driven members together. A brake band is provided for selectively effecting movement of the shoes out of engagement with the drum and to stop rotation of the driven member without interrupting the rotation of the drive member.

20 Claims, 7 Drawing Figures

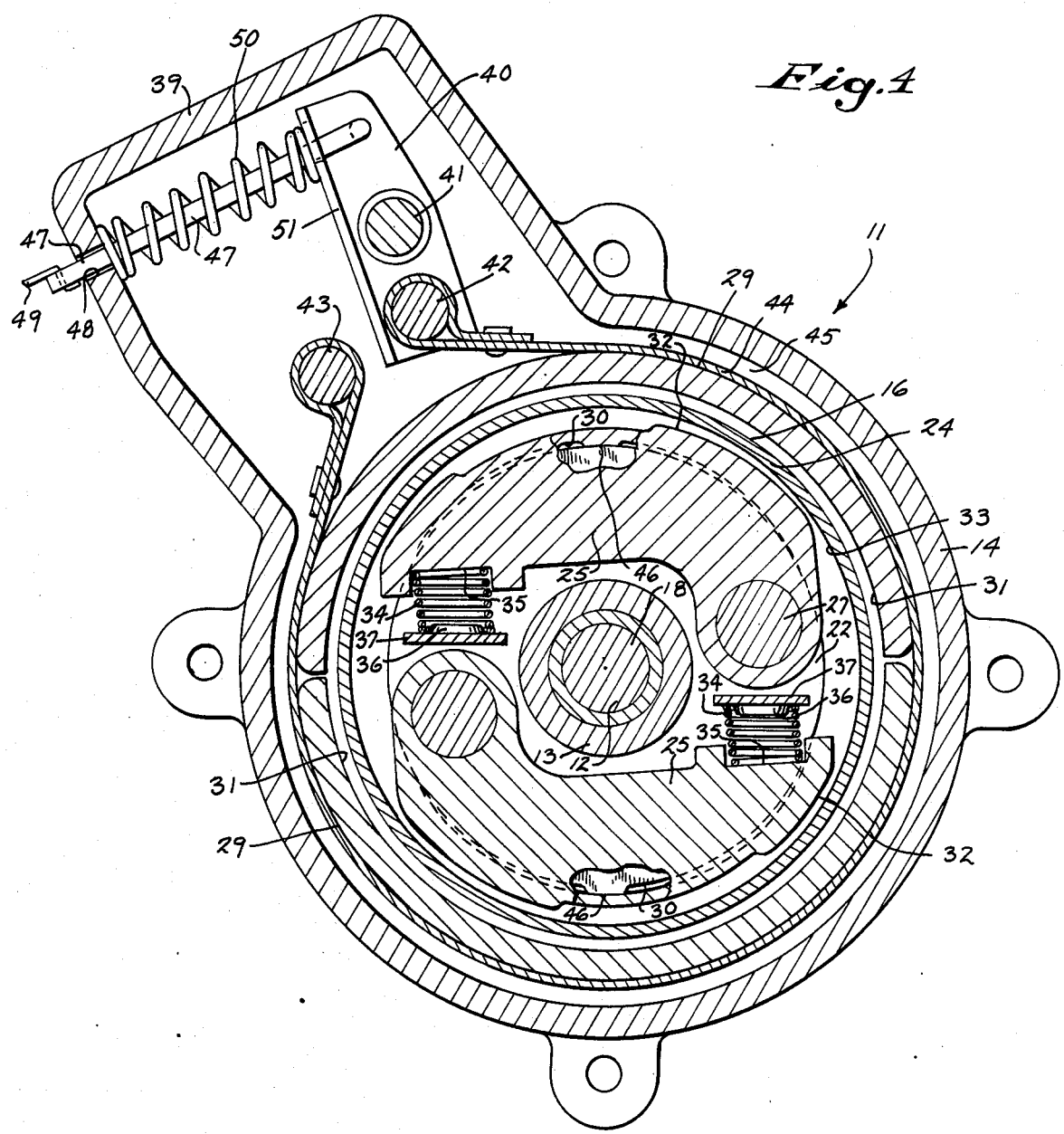
Fig. 4
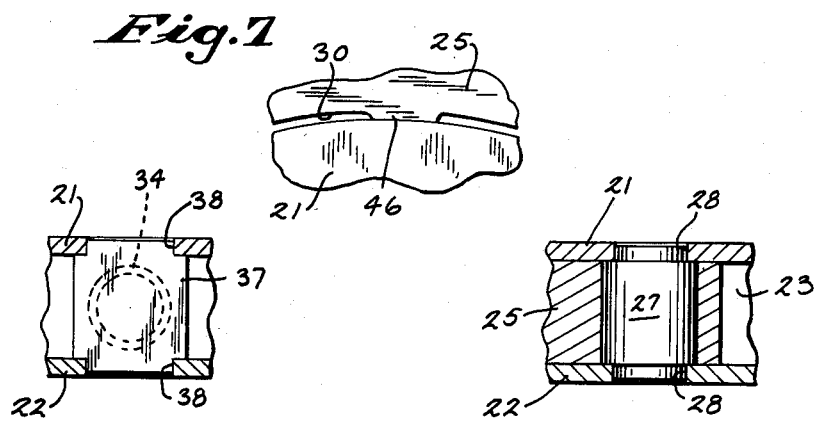
Fig. 7
Fig. 5   Fig. 6

BRAKE RELEASED CLUTCH MECHANISM

BACKGROUND OF THE INVENTION

This invention generally relates to a clutch mechanism adapted for use between rotation drive and driven members particularly for smaller horsepower applications.

In the case of rotary lawn mowers, for example, the blade is usually mounted directly onto the drive member and is stopped only when the drive member and its power source are shut off. While such construction helps to minimize cost, it is considered by many to be unsafe and does result in accidental injury that might be avoided if a clutching mechanism were interposed between the drive member and the blade. It is generally an object of this invention to provide a clutch mechanism, particularly but not exclusively, for smaller horsepower applications, which is quick to release and quick to stop the driven member and is considered to be relatively simple in construction, not unduly large and bulky, and can be made available at reasonable cost. Other possible applications for the clutch mechanism of this invention include garden tillers, snow blowers, cutting tools of various sorts, forming presses, washing machines, etc.

SUMMARY OF THE INVENTION

The invention generally contemplates a clutch mechanism for disposition between rotating drive and driven members. A drum is carried on the drive member. Clutch shoes are carried on the driven member and are movable into and out of clutching engagement with the drum. The construction includes means for effecting movement of the shoes into engagement with the drum to drivingly clutch the drive and driven members together. And means are further provided for selectively effecting movement of the shoes out of engagement with the drum and to stop rotation of the driven member without interrupting the rotation of the drive member.

DESCRIPTION OF THE DRAWING FIGURES

The drawings furnished herewith illustrate the best mode now contemplated for carrying out the invention and are described hereinafter.

In the drawings:

FIG. 4 is a sectional view generally similar to that of FIG. 3, but shows the clutch mechanism in the disengaged position and with braking being applied to the driven member;

FIG. 5 is a detail section taken generally on line 5—5 of FIG. 2;

FIG. 6 is a detail section taken generally on line 6—6 of FIG. 2; and

FIG. 7 is a detail view generally taken on line 7—7 of FIG. 3 and indicates generally the limit of pivotal movement for the shoes inwardly when braking is applied to the shoes and the driven member.

DESCRIPTION OF THE ILLUSTRATED EMBODIMENT

Figure 1:
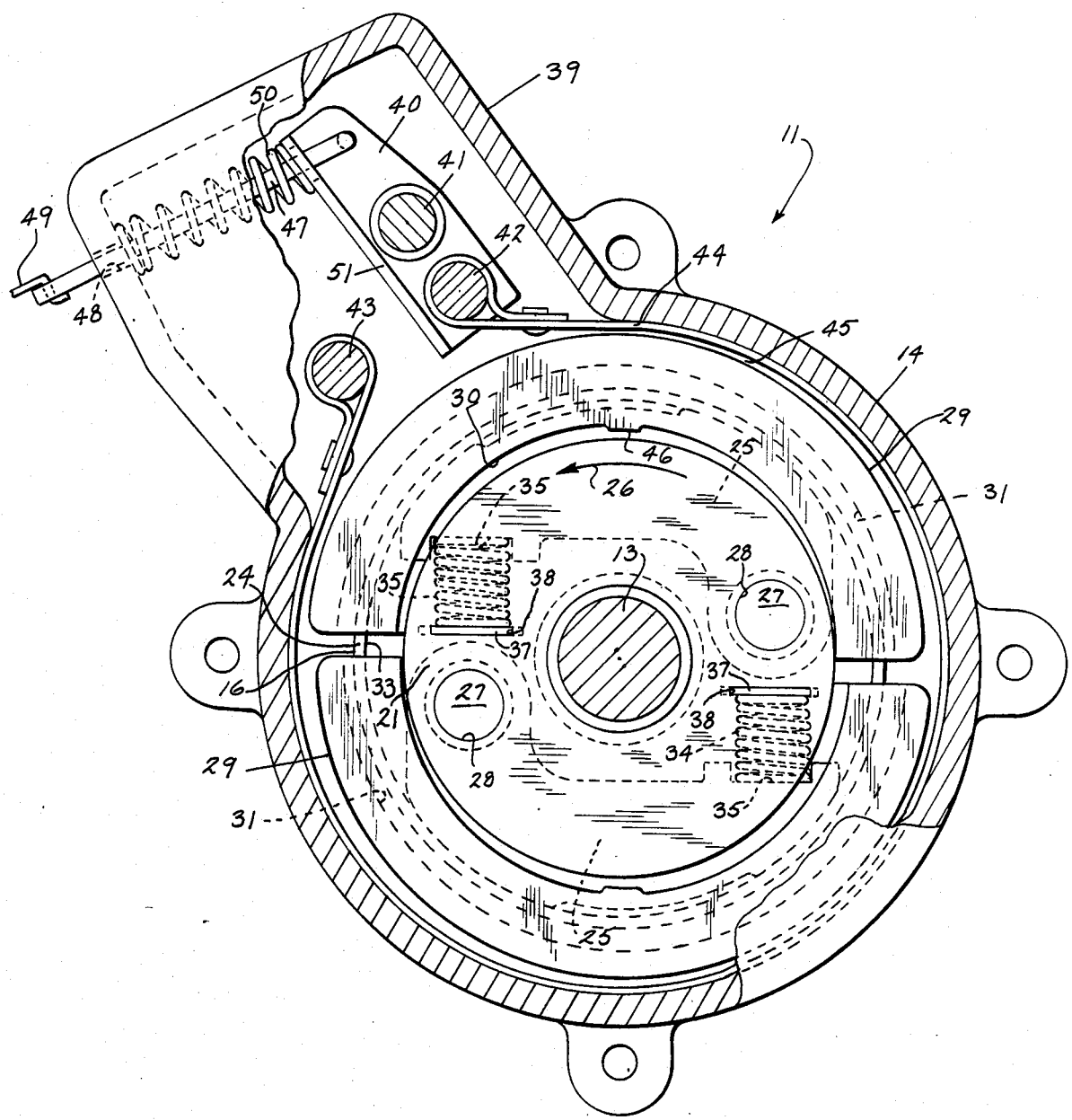
FIG. 1 is a plan view of the clutch mechanism of this invention shown in the engaged position and with parts broken away and sectioned to better show the structural arrangement.

Referring to the drawings, the clutch mechanism 11 of this invention is interposed between a drive shaft 12 of an engine or electric motor, not shown, and a driven shaft 13 for a tool, blade, or other implement, not shown.

Figure 3:
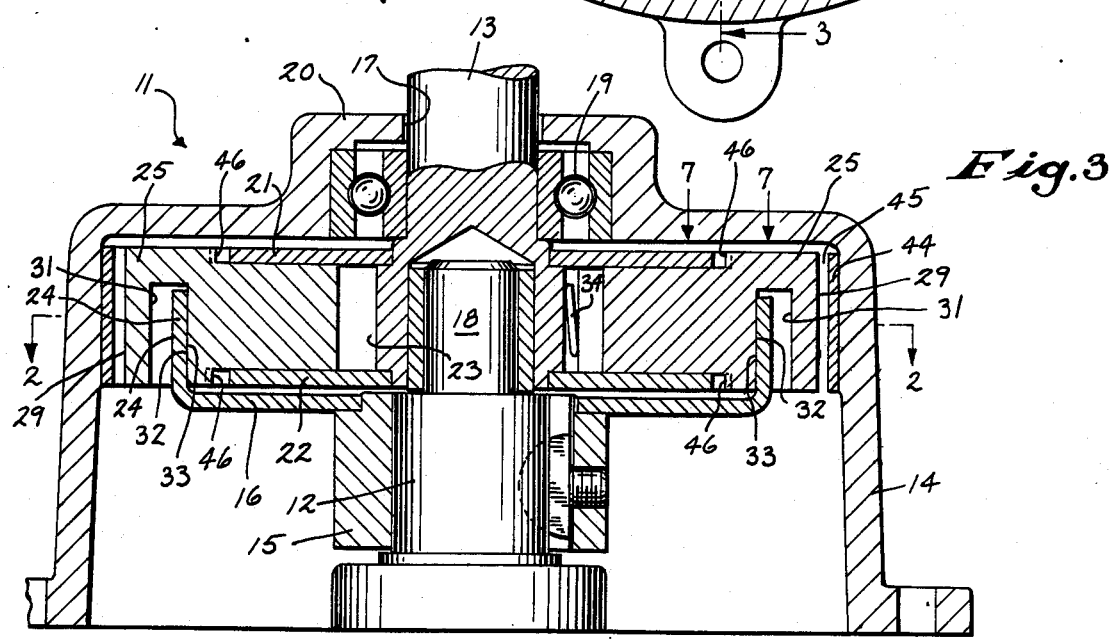
FIG. 3 is a sectional view taken generally on line 3—3 of FIG. 2.

As shown in FIG. 3, the drive shaft 12 projects into the generally cylindrical housing closure 14 and carries a hub 15. The drive shaft 12 further carries the drum 16 which is secured onto the hub 15.

The driven shaft 13 extends through an opening 17 of the housing closure 14 and is piloted on the stepped reduced end 18 of the drive shaft 12. Driven shaft 13 is rotationally supported and axially confined by the ball bearing unit 19 seated in the cupped end portion 20 of the housing closure 14. The driven shaft 13 carries a pair of generally circular, axially spaced, parallel plates 21 and 22 adjacent to the end thereof within the housing closure 14. Plates 21 and 22 together define a peripheral recess 23 partially radially aligned with the circumferential flange 24 of the drum 16 on driven shaft 12.

A pair of diametrically opposed segmental clutch shoes 25 are carried on the driven shaft 13 for engagement with the drum 16. The shoes 25 are arranged symmetrically about the axes of the shafts 12 and 13 and are slidably disposed in the peripheral recess 23 between the spaced plates 21 and 22. In relation to the forward direction of travel of the shafts 12 and 13 as indicated by the arrow 26, each shoe 25 is mounted on a pivot shaft 27 adjacent to the trailing end thereof. Pivot shaft 27 is disposed in axially aligned openings 28 in the driven shaft plates 21 and 22 in the manner shown in the detail of FIG. 6. The pivot shaft mounting for the shoes 25 provide for pivoting of the shoes into and out of engagement with the drum 16 as further described hereinafter.

The respective clutch shoes 25 project radially outwardly beyond the circumferential flange 24 of the drum 16 with the arcuate outer surface 29 of the shoes being spaced from the circular wall of the housing closure 14. Radially outward beyond the peripheral edge of plates 21 and 22, the opposed side surfaces of the shoes 25 are stepped or project axially outward to provide the shoes with opposed arcuate, inwardly facing shoulders 30 generally aligned with and spaced from the plates.

The circumferential flange 24 of drum 16 projects into an opposed arcuate recess 31 of the respective shoes 25. When the shoes 25 are pivoted to their outermost position as depicted in FIGS. 1-3, the inner face 32 of recesses 31 are disposed in a circular configuration to match that and drivingly engage with the opposed inner face 33 of the drum flange 24.

The opposed surfaces 32 and 33 of the clutch shoes 25 and flange 24, respectively, are normally engaged as provided for by the compression springs 34 which serve to bias the shoes outwardly for clutch engagement. The biasing springs 34 are disposed between opposed seats 35 and 36, respectively provided adjacent to the free end of shoes 25 and by the plate members 37 spaced therefrom. As generally shown in FIG. 5, the plate members 37 are fixedly secured in axially aligned slots 38 in the spaced plates 21 and 22.

The housing closure 14 includes a radially projecting portion 39 which encloses an actuating lever 40 pivotally mounted at approximately its center on the pintle 41 that generally parallels the shafts 12 and 13. Adjacent to the inner end thereof the lever 40 carries a pin 42. A fixed pin 43 projects from the housing portion 39 in circumferentially spaced relation from the lever 40 and the pin 42. A brake band 44 is disposed in the clearance 45 between the outer surface 29 of shoes 25 and the inner cylindrical wall of housing 14 and has one end thereof anchored on the lever pin 42 and the other end thereof anchoring on the fixed pin 43.

Figure 2:
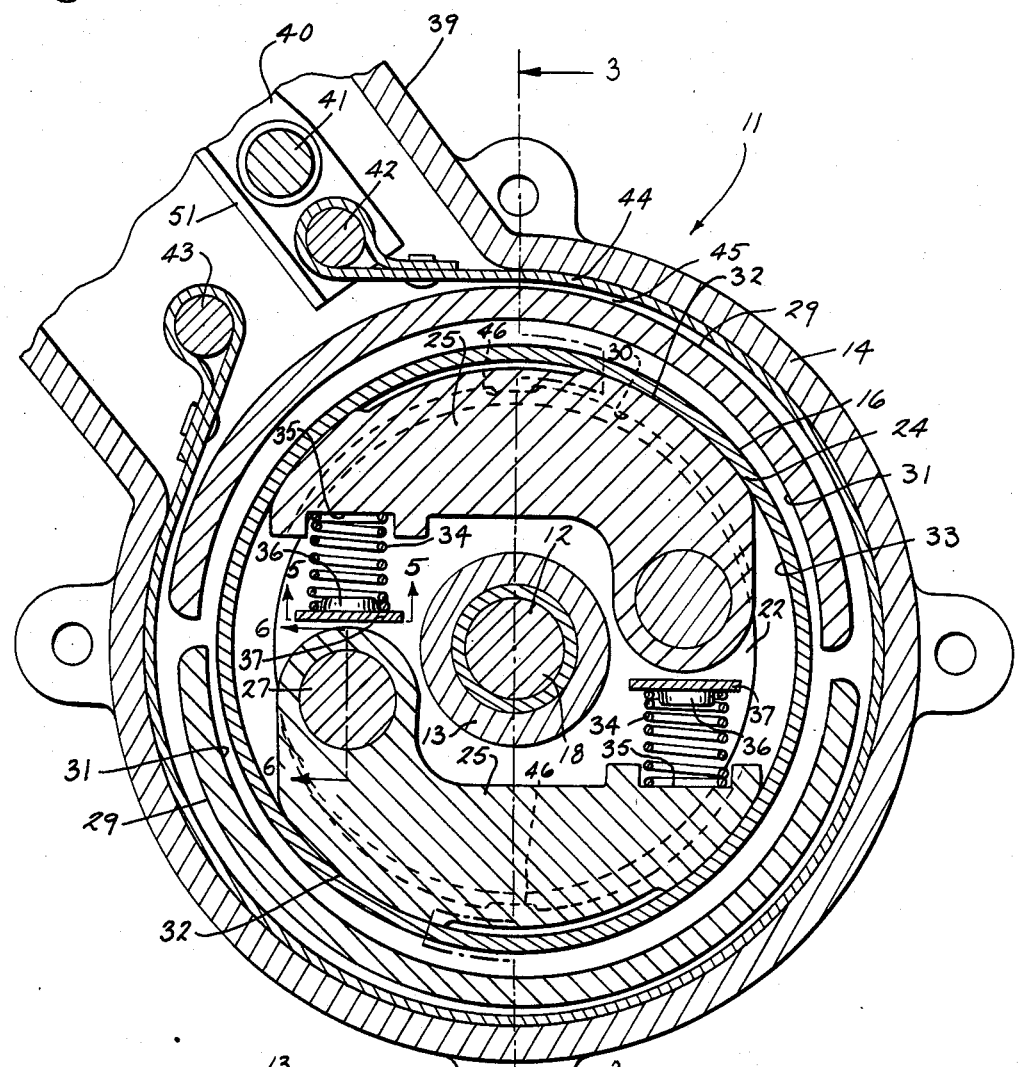
FIG. 2 is a sectional view of the clutch mechanism taken generally on line 2—2 of FIG. 3.

The lever 40 is actuatable between a non-braking position as shown in FIGS. 1-3 and a braking position as shown in FIG. 4. In the non-braking position of lever 40 as depicted in FIG. 1, the brake band 44 is extended in the clearance 45 to form a larger arc and remain in spaced relation from the outer surface 29 of the shoes 25. When the brake band 44 is extended to its non-braking position, the shoes 25 are biased into engagement with the drum 16 by the springs 34 to clutch the drive shaft 12 and driven shaft 13 together, contact being maintained between the respective surfaces 32 of the shoes and the inner dum flanged surface 33.

When the lever 40 is actuated to the braking position shown in FIG. 4, the brake band 44 is contracted into a smaller arc to effect an engagement with the outer shoe surfaces 29 and thereby pivot the shoes 25 inwardly against the bias of springs 34. When the brake band 44 is contracted into its braking position, the clutching surfaces 32 and 33 on the shoes 25 and drum 16, respectively, are caused to separate as shown in FIG. 4 to declutch the driven shaft 13 from the drive shaft 12. In the forward direction of travel of shoes 25 as indicated by the arrow 26, the contracting brake band 44 is initially brought into contact with the shoes 25 and then frictionally tightens itself thereon so as to be self-energizing and thus effects a quick clutch release and a quick stop of the driven shaft 13 with no interruption in the rotation of the drive shaft 12 and its power source. In the braking sequence, the inward pivotal movement of shoes 25 is halted when the inward projections 46 formed on the inwardly facing shoulders 30 of the shoes engages with the opposed peripheral outer edges of the plates 21 and 22 as generally shown in FIG. 7. When in the innermost braking position, the outer surfaces 29 of the shoes 25 generally define a circle or are symmetrical relative to the axes of shafts 12 and 13. Though the brake band 44 is not self-energizing in the reverse direction of travel of shoes 25, it nevertheless is effective upon contraction to provide for clutch release and stopping of the driven shaft 13 without interruption of the drive shaft 12 and its power source. Thus the clutch mechanism of this invention can also be used in applications requiring a reversible power source.

The lever 40 is actuated by the control rod 47 pivotally connected thereto adjacent to the opposed end from the brake band anchor pin 42. The control rod 47 projects through an opening 48 of the housing projection 39 and is actuated through a rod extension or control cable 49 by a deadman's handle or other hand manipulated control unit, not shown. A helical compression spring 50 is disposed around the rod 47 in housing closure 14 and is seated between the wall of housing projection 39 and the opposed flange 51 on lever 40. Upon release of the deadman's handle or other control unit, the biasing force of spring 50 actuates the lever 40 to its braking position to release the clutching engagement between the shoes 25 and drum 16 and stop rotation of the driven shaft 13 without disruption of the drive shaft 12 and its power source.

Various modes of carrying out the invention are contemplated as being within the scope of the following claims particularly pointing out and distinctly claiming the subject matter which is regarded as the invention.

We claim:

1. In a clutch mechanism for disposition between rotatable drive and driven members, a drum carried on said drive member, clutch shoes pivotally carried on said driven member and being movable relative thereto into and out of clutching engagement with the drum, means for effecting movement of said shoes into engagement with the drum to drivingly clutch the drive and driven members together, and a brake band for effecting movement of said shoes out of engagement with the drum and to stop rotation of the driven member without interrupting the rotation of the drive member said brake band, clutch shoes and drum being generally aligned radially.

2. The structure as set forth in claim 1 wherein spring means bias the shoes into engagement with the drum.

3. The structure as set forth in claim 2 wherein the brake band for effecting movement of said shoes out of engagement with the drum and to stop rotation of the driven member provides for overcoming the bias of the spring means to effect a disengagement from the drum and may be selectively actuated.

4. The structure as set forth in claim 1 wherein spring means are disposed adjacent to the free end of the clutch shoes to bias the shoes into engagement with the drum.

5. The structure as set forth in claim 1 wherein the brake band extends around the clutch shoes and has one end thereof secured to a fixed anchor and the opposite end thereof secured to a movable anchor, means to move the movable anchor to contract the brake band into contact with the shoes to brake the driven member, said brake band being self-energizing upon initial contact with the clutch shoes when the direction of rotation for the clutch shoes in relation to the brake band is from the movable anchor toward the fixed anchor.

6. In a clutch mechanism for disposition between rotatable drive and driven members, a drum carried on said drive member, clutch shoes pivotally carried on said driven member and being pivotally movable relative thereto into and out of clutching engagement with the drum, means for effecting movement of said shoes into engagement with the drum to drivingly clutch the drive and driven members together, and means for effecting movement of said shoes out of engagement with the drum and to stop rotation of the driven member without interrupting the rotation of the drive membrer, said clutch shoes being provided with radially spaced, generally circumferential inner and outer surfaces, the inner surface of each shoe being engageable with the drum and the outer surface being engageable by the means for effecting movement of said shoes out of engagement with the drum.

7. The structure as set forth in claim 6 wherein the inner surface of each shoe for engaging the drum is generally symmetrical with respect to the axes of the drive and driven members in the outer drum engaging position of the shoes and the outer surfaces of each shoe for engagement by the means for effecting movement of said shoes out of engagement with the drum is generally symmetrical with respect to the axes of the drive and driven members in the inner position of the shoes.

8. In a clutch mechanism for disposition between rotatable drive and driven members, a drum carried on said drive member, clutch shoes carried on said driven member, said clutch shoes being pivotally connected adjacent one end thereof to the driven member and being pivotally movable radially in a given plane relative to the driven member into and out of clutching engagement with the drum, means biasing said shoes into engagement with the drum to drivingly clutch the drive and driven members together, brake means selectively engageable with the clutch shoes to effect a disengagement between said shoes and the drum and to stop said driven member without interrupting the rotation of said drive member, said biasing means for effecting movement of the shoes into engagement with the drum and said selectively engageable brake means for effecting disengagement of the shoes from the drum being generally disposed in and acting in said given plane and means biasing the brake means to effect the disengagement between the clutch shoes and drum and to stop said driven member.

9. The structure as set forth in claim 8 wherein the means biasing said shoes into engagement with the drum comprises spring means which exerts its biasing force outwardly adjacent to the free end of the clutch shoes.

10. In a clutch mechanism for disposition between rotatable drive and driven members, a drum carried on said drive member, clutch shoes carried on said driven member, said clutch shoes being pivotally connected adjacent one end thereof to the driven member and being pivotally movable radially relative to the driven member into and out of clutching engagement with the drum, means biasing said shoes into engagement with the drum to drivingly clutch the drive and driven members together, a brake band selectively engageable with the clutch shoes to effect a disengagement between said shoes and the drum and to stop said driven member without interrupting the rotation of said drive member and means biasing said brake band to effect the disengagement between the clutch shoes and drum and to stop the driven member.

11. In a clutch mechanism for disposition between rotatable drive and driven members, a drum carried on said drive member, clutch shoes carried on said driven member, said clutch shoes being pivotally connected adjacent one end thereof to the driven member and being pivotally movable radially relative to the driven member into and out of clutching engagement with the drum, means biasing said shoes into engagement with the drum to drivingly clutch the drive and driven members together, a brake band selectively engageable with the clutch shoes to effect a disengagement between said shoes and the drum and to stop said driven member without interrupting the rotation of said drive member, said brake band extending around the clutch shoes and having one end thereof secured relative to a fixed anchor and the opposite end thereof secured to a movable anchor, said brake band being extended in one position of the movable anchor to avoid contact with the clutch shoes and thus provide for engagement between said shoes and the drum to drivingly clutch the drive and driven members together and being contracted in a second position of the movable anchor to pivot the clutch shoes inwardly against the force of the biasing means to thus effect disengagement between said shoes and the drum and to stop said driven member means biasing said brake band to said second position.

12. The structure as set forth in claim 11 wherein the clutch shoes have a generally arcuate recess that opens in the direction of the drum and receives the circumferential flange of the drum, said recesses having a radially outward facing surface for drivingly engaging the drum flange and which are symmetrical with respect to the axes of the drive and driven members to generally match the curvature of the drum flange when the shoes are pivoted outwardly into driving engagement with the drum flange, said clutch shoes further having an outer arcuate surface engageable by the braken band, said outer arcuate surface of said clutch shoes being generally symmetrical with respect to the axes of the drive and driven members when the clutch shoes are pivoted to their inward position by the contracted brake band.

13. The structure as set forth in claim 11 wherein the movable anchor for the brake band is carried by a pivotally mounted lever movable between a brake band extending position and a brake band contracting position.

14. The structure as set forth in claim 13 wherein the pivotally mounted lever carrying the movable anchor for the brake band is biased by spring means toward the brake band contracting position, and control means connected to the lever for selectively moving and holding the lever against the bias of the spring means in the brake band extending position, the biasing force of the spring means serving to return the lever to the brake band contracting position when the control means connected to the lever is selectively released.

15. In a clutch mechanism for disposition between rotatable drive and driven members, a drum carried on said drive member, clutch shoes pivotally carried on said driven member and being pivotally movable relative thereto into and out of clutching engagement with the drum, means for effecting movement of said shoes into engagement with the drum to drivingly clutch the drive and driven members together, and means for effecting movement of said shoes out of engagement with the drum and to stop rotation of the driven member without interrupting the rotation of the drive member, said clutch shoes being provided with a pair of radially spaced, generally circumferential surfaces, one of said pair of surfaces being engageable with the drum and the other of said pair of surfaces being engageable by the means for effecting movement of said shoes out of engagement with the drum.

16. A combined brake and clutch mechanism comprising a drive member mounted for rotation and including thereon a clutch drum, a driven member carried for rotation coaxially with and relative to said drive member, a clutch shoe pivotally connected to said driven member for common rotation therewith and for pivotal movement relative to a position of engagement with said clutch drum, biasing means for urging said clutch shoe toward said position of engagement, a brake surface on said clutch shoe, a brake member moveable between a first position wherein said brake member is spaced from said brake surface and a second position wherein said brake member engages with the brake surface to brake rotation of said driven member and to displace said clutch shoe from said position of engagement against the action of said biasing means, and means biasing said brake member to said second position.

17. A combined brake and clutch mechanism in accordance with claim 16 and further including manual means (49,47,51) for overpowering said brake member biasing means (50) so as to displace said brake member (44) to said first position.

18. A combined brake and clutch mechanism in accordance with claim 16 wherein said driven member (13) carries thereon an abutment (37) and wherein said biasing means (34) comprises a spring acting between said abutment (37) and said clutch shoe (25).

19. A combined brake and clutch mechanism in accordance with claim 16 wherein said clutch drum (16) is located radially outwardly of said clutch shoe (25) and extends in generally parallel relation to the axis of drive shaft rotation and wherein said brake surface (29) is located radially outwardly of and in generally parallel relation to said clutch drum (16).

20. A combined brake and clutch mechanism in accordance with claim 19 wherein said brake surface (29) constitutes one leg of an L-shaped member including a second leg extending radially inwardly and fastened to said clutch shoe (25).

* * * * *

UNITED STATES PATENT AND TRADEMARK OFFICE
CERTIFICATE OF CORRECTION

PATENT NO. : 4,669,590
DATED : June 2, 1987
INVENTOR(S) : HUGH A. ZINDLER ET AL

It is certified that error appears in the above-identified patent and that said Letters Patent is hereby corrected as shown below:

Col. 1, line 6, Delete "rotation" and substitute therefor
---rotating---

Col. 3, line 8, Delete "anchoring" and substitute therefor
---anchored---

Col. 3, line 20, Delete "dum" and substitute therefor
---drum---

Claim 6, col. 4, line 53, Delete "membrer" and substitute therefor
---member---

Claim 12, col. 6, line 11, Delete "braken" and substitute therefor
---brake---

Signed and Sealed this

Twenty-seventh Day of October, 1987

Attest:

DONALD J. QUIGG

Attesting Officer

Commissioner of Patents and Trademarks